(12) United States Patent
Boellaard et al.

(10) Patent No.: US 11,300,467 B2
(45) Date of Patent: Apr. 12, 2022

(54) DIFFERENTIAL PRESSURE SENSOR WITH RFID TAG

(71) Applicant: Smartrac Investment B.V., Amsterdam (NL)

(72) Inventors: Alex Boellaard, Emst (NL); Laurence Singleton, Dresden (DE); Ray Freeman, Mesa, AZ (US); Henry Prescher, Dresden (DE); Patrick Mende, Leipzig (DE)

(73) Assignee: SMARTRAC INVESTMENT B.V., Oegstgeest (NL)

( * ) Notice: Subject to any disclaimer, the term of this patent is extended or adjusted under 35 U.S.C. 154(b) by 249 days.

(21) Appl. No.: 16/738,511

(22) Filed: Jan. 9, 2020

(65) Prior Publication Data

US 2021/0215562 A1    Jul. 15, 2021

(51) Int. Cl.
G01L 19/08    (2006.01)
G01L 19/00    (2006.01)
G01L 9/00     (2006.01)

(52) U.S. Cl.
CPC .......... G01L 19/086 (2013.01); G01L 9/0051 (2013.01); G01L 19/0092 (2013.01); G01L 19/083 (2013.01)

(58) Field of Classification Search
None
See application file for complete search history.

(56) References Cited

U.S. PATENT DOCUMENTS

| | | | |
|---|---|---|---|
| 9,227,764 B2 * | 1/2016 | Martino | ............... E04B 2/7457 |
| 10,902,709 B2 * | 1/2021 | Martino | ............ G08B 13/2448 |
| 2013/0033364 A1 * | 2/2013 | Raz | ................. G06K 19/07767 340/10.1 |
| 2013/0036802 A1 * | 2/2013 | Johnson | ............... G01N 27/048 73/74 |
| 2017/0167932 A1 | 6/2017 | Donskoy et al. | |
| 2021/0140351 A1 * | 5/2021 | Green | ................... F01M 11/04 |

FOREIGN PATENT DOCUMENTS

| | | |
|---|---|---|
| DE | 102016012326 A1 | 5/2017 |
| EP | 2359314 A1 | 8/2011 |
| EP | 3447465 A1 | 2/2019 |
| WO | 2006102678 A1 | 9/2006 |

OTHER PUBLICATIONS

European Patent Office, Extended Search Report, Application No. 17187963.8, dated Feb. 20, 2018, 6 pages.
European Patent Office, Communication, Application No. 17187963.8, dated Mar. 2, 2021, 5 pages.

* cited by examiner

Primary Examiner — Peter J Macchiarolo
Assistant Examiner — Jermaine L Jenkins
(74) Attorney, Agent, or Firm — Quarles & Brady LLP

(57) ABSTRACT

A differential pressure sensor with wireless RFID communication ability senses and records a specified differential pressure threshold without great energy consumption and without requiring direct access or visual inspection of the sensing element. The differential pressure sensor includes a sensing element sensing a differential pressure between a low pressure side and a high pressure side and a RFID tag comprising a tag antenna, a tag integrated circuit (IC) and a tamper loop connected to the tag IC for tracking a specific differential pressure threshold of the differential pressure sensor. The RFID tag is connected to the sensing element in such a way that the tamper loop is triggered if the specific differential pressure threshold has been reached.

15 Claims, 6 Drawing Sheets a)

b)

a)

b)

c)

Top View d)

Top View

Bistable cup or Belleville spring, convex state

Bistable cup or Belleville spring, convex state

Conductive material on bottom of Belleville spring closes the tamper loop

DIFFERENTIAL PRESSURE SENSOR WITH RFID TAG

The disclosure relates to a differential pressure sensor with wireless RFID communication ability.

A differential pressure sensor is a pressure sensor which measures the difference between two absolute pressures, the differential pressure. The differential pressure sensor can comprise two measuring chambers which are hermetically separated from each other by a membrane. The deflection of the diaphragm or membrane is then a quantity of the magnitude of the differential pressure.

A differential pressure transmitter is used for the continuous measurement of pressure differences in liquids, vapors, gases and dusts. For example, from the differential pressure, the hydrostatic fill level in a vessel or the mass flow through a pipe can be calculated. Also, the saturation of a particulate filter can be determined by measuring the differential pressure before and after the particulate filter.

In order to monitor the optimum functioning of a filter differential pressure measurement, so-called mechanical filter minders have been used which mechanically keep track of the pressure differential over a filter. The disadvantages of the mechanical filter minders are on the one hand a required visual inspection and on the other hand that these minders have to be installed separate from the filter and may require additional work to fit the air box. For example, the filter minder is attached directly to the air induction system of a car or a truck motor. This may require modification of the induction system to accommodate the filter minder.

For filter differential pressure measurement also an engine MAP (manifold absolute pressure) sensor can be used. But this measurement setup requires a MAP sensor to be available as well as separate electronics for processing the pressure data and additional wiring to the MAP sensor, vehicle electronic control unit (ECU) or on board diagnostic tools (OBD) are required.

The purpose of the disclosure is to overcome the disadvantages by providing a means to sense and record a specified differential pressure threshold to be crossed with the additional ability to communicate this without the requirement of a local energy source. No direct access or visual inspection of the sensing element should be required. Using filter differential pressure sensors, the differential pressure threshold can be set to the same threshold as the filter specified termination point. But the disclosure should not be limited to filter differential pressure sensors; it can be used in other applications where a pressure differential threshold has to be recorded. For filter applications, the means to sense and record a specified differential pressure threshold can be part of the filter itself and does not require to be installed separately, as it was previously the case.

The objective of the disclosure will be reached by a differential pressure sensor comprising a sensing element sensing a differential pressure between a low pressure side and a high pressure side and a RFID tag comprising a tag antenna, a tag integrated circuit (IC) and a tamper loop connected to the tag IC for tracking a specific differential pressure threshold of the differential pressure sensor, whereas the RFID tag is connected to the sensing element in such a way that the tamper loop as part of the RFID tag is triggered if the specific differential pressure threshold has been reached. The sensing element of the differential pressure sensor separates two volumes of gas with different pressure, using an airtight connection, e.g. a hole in an air duct with ambient pressure on the outside and lower pressure on the inside. It is important that there is no flow between the two volumes of gas. The RFID tag structure with a so called tamper loop is used to indicate if a differential pressure threshold has been reached. Therefore, the RFID tag uses an integrated circuit (IC) that has a so-called tamper loop feature—meaning that the tamper loop is a track on the RFID tag connected to the IC. The IC, when energized, is capable of detecting if the tamper loop is closed/unbroken (low resistance) or opened/broken (high resistance). If the pressure difference between the low and high pressure side reaches a threshold, that can be predefined by design parameters of the differential pressure sensor itself or the RFID tag or the tamper loop, the tamper loop tears as a result of the pressure difference between the two sides of the tag and the resistance of that tamper loop essentially goes from 0 to infinite, which is registered by the IC of the RFID tag. As a result, the IC switches a so-called tamper bit, which can be read with a standard RFID reading device using standard RFID communication protocols. A great advantage by using wireless communication means is that the measurement results can be communicated without needing an energy source on the RFID tag.

In one embodiment of the present disclosure the sensing element is a membrane or it can be a filter element as well. The membrane as well as the filter element separates the two volumes of gas.

In a preferred embodiment of the disclosure the RFID tag covers airtight a hole in the sensing element in such a way that a part of the tamper loop suspends over the hole and the tamper loop tears if the specific differential pressure threshold has been reached. The tearing of the tamper loop is accomplished by suspending a part of that loop over a hole connecting two volumes of gas with different pressure, using an airtight connection, e.g. a hole in an air duct with ambient pressure on the outside and lower pressure on the inside or a hole in a filter with ambient pressure on the outside and lower pressure on the inside of the filter due to the pressure drop over the filter. The RFID tag structure with the tamper loop can be used to fully cover the hole, ensuring that there is no flow between the two volumes of gas, and placed such that a part of the tamper loop is suspended over the hole. A differential pressure exerts a force on the part of the tag suspended over the hole, which tears if a certain differential pressure threshold has been reached. Summarizing this preferred embodiment, the differential pressure presses on the membrane or filter covering the hole. The membrane can be weakened by a perforation or kiss cut which is described later. This perforation passes under the tamper loop connected to the IC. The membrane breaks at the weakened area, also breaking the tamper loop. The electrical connection is lost i.e. change of resistance from low resistance (connected) to high resistance (broken).

Therefore, the RFID IC detects this change of resistance. And by reading the RFID IC, the change of state can be determined.

In another preferred embodiment of the disclosure the RFID tag comprises a bi-stable cup spring mounted over the tamper loop, whereas the bi-stable cup spring closes a conductive contact at the tamper loop if the specific differential pressure threshold has been reached and the conductive contact is open in an initial state if the specific differential pressure threshold has not been reached, yet. The purpose of using a bi-stable cup spring is that the spring can be used as a resettable pressure indicator that can be reset such that the RFID tag with the tamper loop can be used many times. Another advantage of this embodiment is that there is no gas flow requirement and the two gas volumes remain completely separated from each other. The bi-stable cup is used to trigger the tamper loop. Therefore, the cup spring is mounted over the hole of the differential pressure sensor like the tamper loop, whereas the hole is closed by a membrane or filter or by the RFID tag itself. So, the membrane covers the hole in order to prevent air entry through the hole. When the pressure differential exists, the membrane bends inward into the hole. The difference gas pressure between the two volumes of gas will depress the cup and cause it to go from a stable convex to a stable concave state at a certain well defined difference pressure threshold. The tamper loop on the RFID tag in this case is interrupted by means of two pads or contacts with a certain distance to each other, so that the normal state of the loop is one of high or infinite resistance when there is no connection between the two pads on the tamper loop. When the cup goes from convex to concave, a conductor on the bottom of the spring will press against the two pads causing the tamper loop to close, because the contact on the bottom of the spring connects the two pads on the tamper loop forming a conductive connection. As this is a stable state for the cup, it will remain in this position, and therefore indicate that a certain difference pressure threshold has been reached. As before, the tamper loop works like a switch and the status of the tamper loop is recognized by the IC and can be read with a RFID reader.

Yet another preferred embodiment according and similar to the cup spring is to use any kind of a snap action switch. Such switches may be based on rubber dome or silicone dome switches, similar to computer keyboard switches but they should be bi-stable.

In another preferred embodiment the bi-stable cup spring is usable several times by resetting the conductive contact in its initial state. Resetting of the tag is done by bringing the cup back in the convex state by e.g. mechanical means or applying a reverse differential pressure. Therefore, the spring can be used as a resettable pressure indicator that can be reset such that the RFID tag with the tamper loop can be used many times. Summarizing this preferred embodiment, the differential pressure pushes the membrane into the hole. The membrane deforms, resulting the metal line of the bi-stable switching element touching an underlying metal line, meaning the tamper loop. In this case the resistance then jumps from high (no connection) to low (connected). This change is detected by the RFID IC and can be read by the RFID interrogation.

In a preferred embodiment of the disclosure the specific differential pressure threshold is adjustable by a size of the hole in the sensing element. The differential pressure threshold at which the material of the RFID tag, more precisely the material of the tamper loop will tear will depend on the force exerted by the differential pressure on the material, which is proportional to the surface area of the hole in the sensing element. The size of the hole can be used to set the value of the differential pressure threshold. For example, the pressure (difference) on the membrane is constant; then by increasing the area i.e. increasing the diameter of the hole, there is an increase of the sum force within that area. In the case of the perforation, that will be described in more detail later, the same perforation structure will break earlier for large diameter hole compared to a small diameter hole.

In another preferred embodiment of the disclosure the specific differential pressure threshold at which the material of the tamper loop tears can be modified by influencing material properties and can therefore be adjusted by a thickness and/or type of material of the RFID tag or tamper loop in a surface area of the hole in the sensing element, because the stiffness to bending or deforming of the material is related to Young's modulus. Changing the material type will change this parameter. However, the thickness influences this. For example, the thinner the thickness of the tamper loop and/or the underlying carrier material the lower the differential pressure threshold and vice versa, but assuming that the material does not stretch as a result of being thinner. Different types of conductive materials can be used for the tamper loop of the RFID tag. E.g. screen printed silver ink or conductive organic polymers can be used for brittle tamper loop tracks that easily break when bent.

In another embodiment the specific differential pressure threshold is adjusted by a selective weakening of the material of the RFID tag or tamper loop by tear lines in the surface area of the hole in the sensing element or the tamper loop itself. Tear lines are positions or areas on the sensing element or in the tamper loop of the RFID tag where the strength of the material of the sensing element or RFID tag has been weakened by manipulating the material structure, for example the material's tear resistance. Tear lines can also be perforations in the material. This is the key functional aspect of the present disclosure. The perforation modifies the material by creating essentially holes in the material. There is then less material holding the circular area to the rest of the material. If the differential pressure threshold is reached, the material will tear along this line. Having a perforation in the metal trace simply assists the breaking. But obviously, electrical conductivity must still be present, despite perforation. In the case of the RFID tag, as the normal structure for a RFID tag is multi-layer, the material strength of the RFID tag can be weakened in such a way that one material (e.g. the carrier of the RFID structure) is fully removed while the conductive layer or layers stay in place.

In the case of the sensing element, the sensing element can be manipulated by inserting cuts (tear lines) into the membrane. Meaning, the specific differential pressure threshold can also be adjusted by the number and/or orientation of the tear lines in the surface area of the hole in the sensing element. One or more tear lines can be used to weaken the material as well as these lines can be orientated in any direction with respect to the track of the tamper loop. The use of multiple tear lines and the orientation direction can both be used to aid the breaking of the tamper loop track and so to tune for specific differential pressure. Modifying the perforation or tear line, meaning more holes or making the material thickness thicker or thinner, will raise or reduce the force required to cause a break/tear.

In a preferred embodiment of the disclosure the selective weakening is performed by mechanical or laser perforation and/or mechanical or laser kiss cutting. Perforation introduces holes in the material. The laser is pulsed, i.e. laser is switched on and off to generate a series of energy pulses. An optical scanner directs the laser on the surface of the material, along a circular path for example, resulting in a series of holes, which weakens the material on the circle path. In contrast, laser kiss cutting means inserting lines or contours of different and/or limited depth. A certain amount of material is removed along a path, making it easier for the tamper loop track to break. So, kiss cutting is simply a thickness reduction, i.e. if the material thickness on the trace circle is 30 microns, after kiss cutting with laser etc. the thickness is reduced e.g. to 10 microns. This reduction in thickness weakens the material along the path. In the common situation of a closed tamper loop on a carrier material, some of the carrier material or all of the carrier material and even some of the tamper loop track material can be removed to tune the breaking of the track to specific differential pressures.

With the perforation of a part of the sensing element or the tamper loop the material is not completely opened, but the material will break if the force interacting with the membrane or filter, ergo the differential pressure between the two volumes of gas exceeds a predefined differential pressure threshold. The gas flow from one volume to the other through the hole is usually undesirable. Therefore, care has to be taken when the material of the RFID tag tears, because the gas flow through the hole has to be restricted. This can be accomplished by using the material of the RFID tag itself that breaks free when the difference pressure threshold is reached to plug up the hole. It is also undesirable that any RFID tag material fully separates from the RFID tag to enter the gas flow. This can be accomplished in a number of ways using the selective weakening processes mentioned above. For example, in case of plugging up the hole by the material of the RFID tag it would be beneficial to make the part of the RFID tags that breaks free larger than the hole in the sensing element.

In another preferred embodiment of the disclosure the specific differential pressure threshold is adjustable by a tracking design of the tamper loop by passing the tear lines in the surface area of the hole in the sensing element several times. The track design of a tamper loop can be a straight line in the simplest case, but the track of the tamper loop can also take any other shape to optimize the breaking potential. E.g. the track of the tamper loop can be shaped like a square wave in order to increase the total length of the tamper loop and to expose the force caused by the differential pressure. So, multiple lines or circles, which are closely spaced to each other, for example circles with slightly different diameters, can be used. The modified area is weakened in sum, allowing a lower differential pressure threshold for breaking.

In another embodiment of the disclosure the specific differential pressure threshold is adjustable by a positioning of the tear lines in the surface area of the hole in the sensing element of greatest stress. By positioning the cut lines in the area where the stress on the material due to the difference pressure is highest, the force on the tamper loop track and on the material to break will be optimized. This position of greatest stress would be for example at the edge of the circles. If the perforation of the material takes place at that position then there is a higher probability of a break/tear.

In another embodiment of the disclosure the RFID tag is placed in a protective housing. The housing enables the implementation of other design details, for example, it is possible to provide a larger hole for the RFID tag to be suspended over than allowed in the object of which the pressure difference has to be recorded. As the breaking force is proportional to the surface area of the hole, smaller pressure differences can be recorded using larger holes. Furthermore, ensuring that the flow through the RFID tag housing is limited when the tag breaks and to average out rapid pressure fluctuations, when desired, small holes both at the top and at the bottom of the housing can be implemented. The housing may also incorporate filter material to ensure that any gas flowing through the housing is filtered.

The objective of the disclosure will also be solved by a differential pressure measuring process using the differential pressure sensor according to the disclosure, wherein the process comprising the following steps: monitoring a differential pressure by an activated tag IC of a RFID tag, detecting if a pre-defined differential pressure threshold has been reached by an infinite resistance of a tamper loop as part of the RFID tag or detecting if the pre-defined differential pressure threshold has not been reached by a zero resistance of a tamper loop as part of the RFID tag using a RFID transponder. For example, the differential pressure presses on the membrane or filter covering the hole of the differential pressure sensor. The membrane can be weakened by a perforation or kiss cut as described above. This perforation passes under the tamper loop connected to the IC. The membrane breaks at the perforation, and also breaking the tamper loop. The electrical connection is lost i.e. change of resistance from low resistance (connected) to high resistance (broken). Therefore, the RFID IC detects this change of resistance. And by reading the RFID IC, the change of state can be determined. In another example, the differential pressure pushes the membrane into a hole of the differential pressure sensor. The membrane deforms, resulting the metal line of a bi-stable switching element touching an underlying metal line, meaning the tamper loop. In this case the resistance then jumps from high (no connection) to low (connected). This change is detected by the RFID IC and can be read by the RFID interrogation.

The disclosure will be explained in more detail using exemplary embodiments.

BRIEF DESCRIPTION OF THE DRAWINGS

The appended drawings show

DETAILED DESCRIPTION

Figure 1:
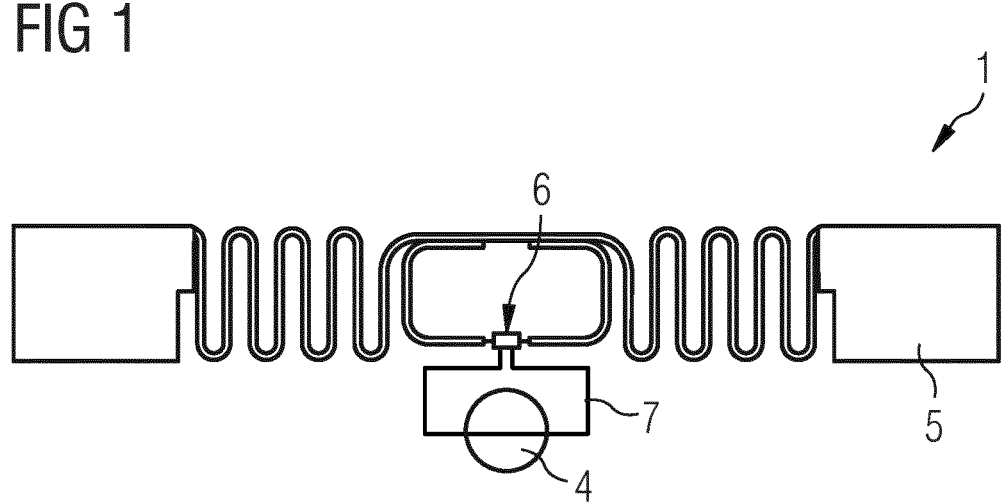
FIG. 1: A schematically top-view of the inventive RFID tag structure used for detecting a differential pressure threshold.
Figure 2:
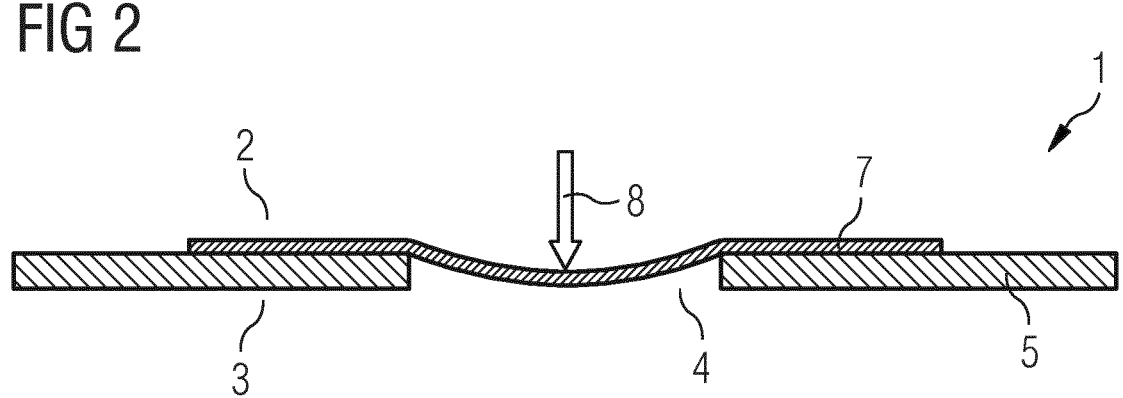
FIG. 2: A schematically side-view of the RFID tag separating a low and high pressure side with the tamper loop and a force on the RFID tag.

FIG. 1 and FIG. 2 show a schematically top- and side-view of the inventive RFID tag structure used in combination with a differential pressure sensor. The RFID tag comprises a tag antenna 5, a tag integrated circuit (IC) 6 and a tamper loop 7 connected to the tag IC 6 for tracking a specific differential pressure threshold of the differential pressure sensor 1. The tamper loop 7 suspends over a hole 4 in the sensing element whereas the hole 4 is covered by the RFID tag itself or by the tamper loop 7 as part of the RFID tag.

The sensing element of the differential pressure sensor 1 separates two volumes of gas with different pressure, using an airtight connection, e.g. a hole in an air duct with ambient pressure on the outside 2 and lower pressure on the inside 3 (FIG. 2). It is important that there is no flow between the two volumes of gas. The RFID tag structure with a so called tamper loop 7 is used to indicate if a differential pressure threshold of the differential pressure sensor 1 has been reached. Therefore, the RFID tag uses an integrated circuit (IC) 6 that has a so-called tamper loop feature—meaning that the tamper loop is a track on the RFID tag connected to the IC 6. The IC 6, when energized, is capable of detecting if the tamper loop 7 is closed (low resistance) or opened (high resistance). If the pressure difference between the two low 3 and high pressure side 2 reaches a threshold, that can be pre-defined by design parameters of the differential pressure sensor 1 itself or the RFID tag or the tamper loop 7, the tamper loop 7 tears as a result of the pressure difference between the two sides 2, 3 of the tag and the resistance of that tamper loop 7 essentially goes from 0 to infinite, which is registered by the IC of the RFID tag. As a result, the IC 6 switches a so-called tamper bit, which can be read with a standard RFID reading device using standard RFID communication protocols. Summarizing this preferred embodiment, the differential pressure presses on the membrane covering the hole 4. The membrane can be weakened by a perforation or kiss cut as described above. This perforation passes under the tamper loop connected to the chip. The membrane breaks 10 at the perforation, also breaking the tamper loop 7. The electrical connection is lost i.e. change of resistance from low resistance (connected) to high resistance (broken). Therefore, the RFID IC 6 detects this change of resistance. And by reading the RFID IC 6, the change of state can be determined.

Figure 3:
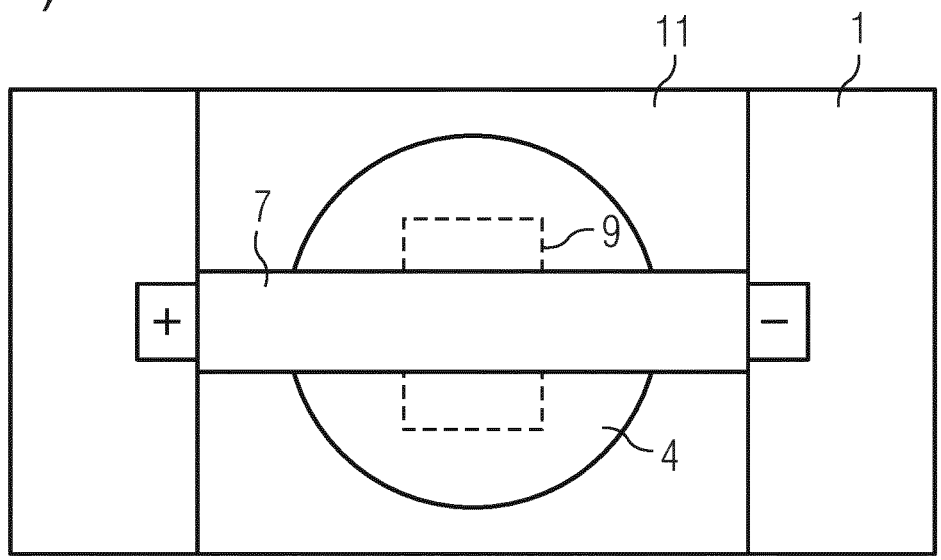
FIG. 3: Top view of the tamper loop suspending over the hole of the sensing element a) unbroken; b) broken.
Figure 3:
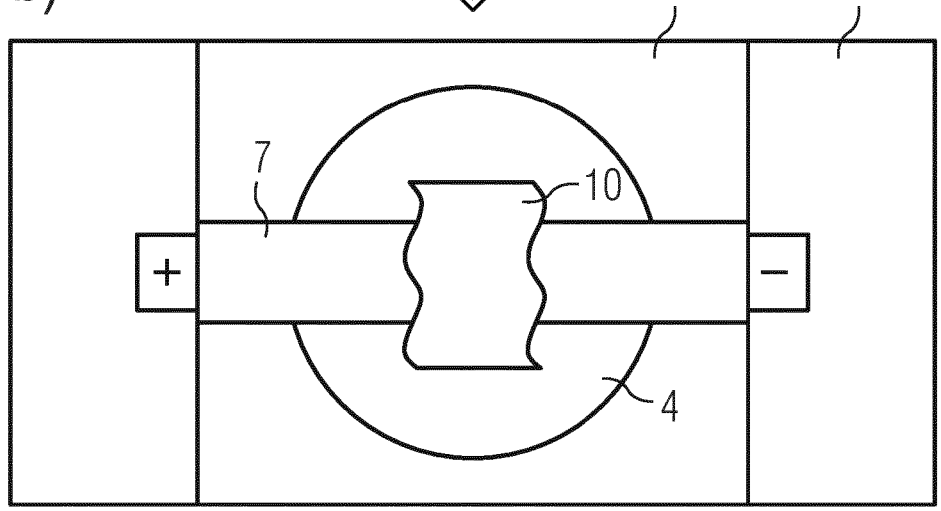

FIG. 3 shows a top view of the tamper loop 7 suspending over the hole 4 of the sensing element 11. FIG. 3*a* shows an unbroken tamper loop 7, because the force on the sensing element 11 of the differential pressure sensor 1 has not been reached the threshold value, yet. As the differential pressure threshold value will be reached the tamper loop breaks 10. The tag IC 6 detects the change in the tamper loop 7 resistance from 0 to infinite. The IC 6 switches a so-called tamper bit, which can be read with a standard RFID reading device using standard RFID communication protocols.

Figure 4:
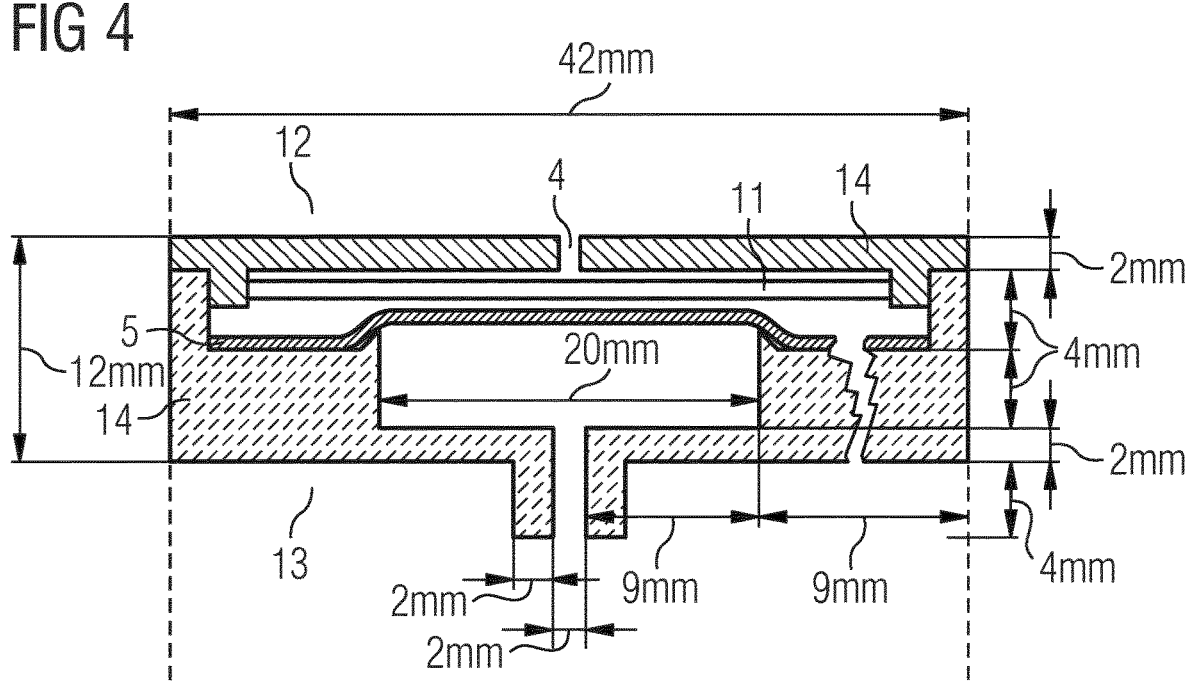
FIG. 4: Schematically view of the RFID tag in a housing.

In another preferred embodiment the RFID tag can be placed in a protective housing 14 (FIG. 4). The housing 14 enables the implementation of other design details, for example, it is possible to provide a larger hole 4 for the RFID tag to be suspended over than allowed in the object of which the pressure difference has to be recorded. As the breaking force is proportional to the surface area of the hole 4, smaller pressure differences can be recorded using larger holes. Furthermore, ensuring that the flow through the RFID tag housing 14 is limited when the tag breaks and to average out rapid pressure fluctuations, if desired, small holes both at the top and at the bottom of the housing can be implemented. The housing 14 may also incorporate filter material 11 to ensure that any gas flowing through the housing 14 is filtered.

Figure 5:
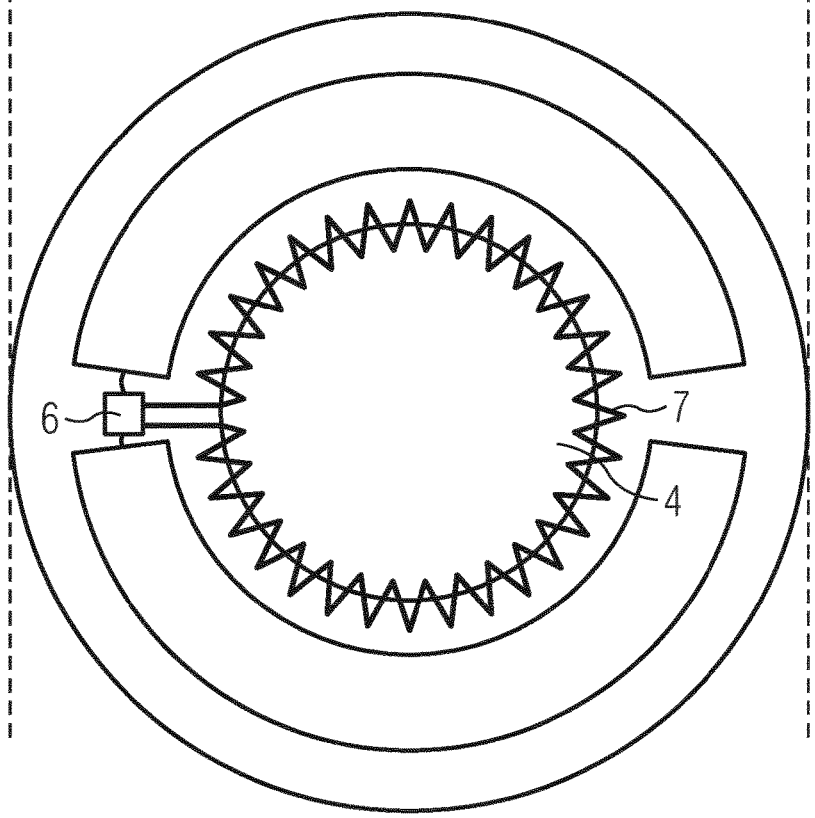
FIG. 5: Possible tamper loop track design.

FIG. 5 shows a preferred embodiment for influencing the tearing of the tamper loop 7 when only a part of the physical structure of the sensing element with the RFID tag tears. To ensure that the tamper loop 7 breaks also, the tamper loop track 7 is designed such that it passes over tear lines multiple times as shown in FIG. 5.

Figure 6:
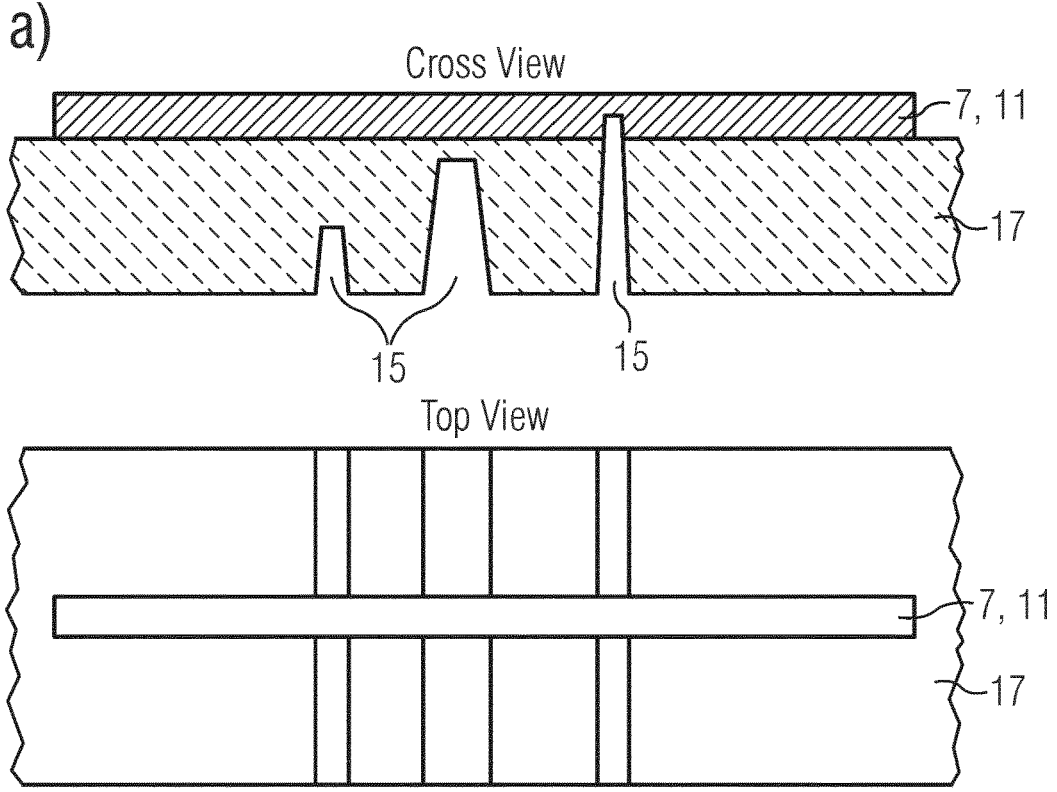
FIG. 6: Schematically views (a) to d)) of mechanisms for selective weakening the sensing element or tamper loop for adjusting the differential pressure threshold.
Figure 6:
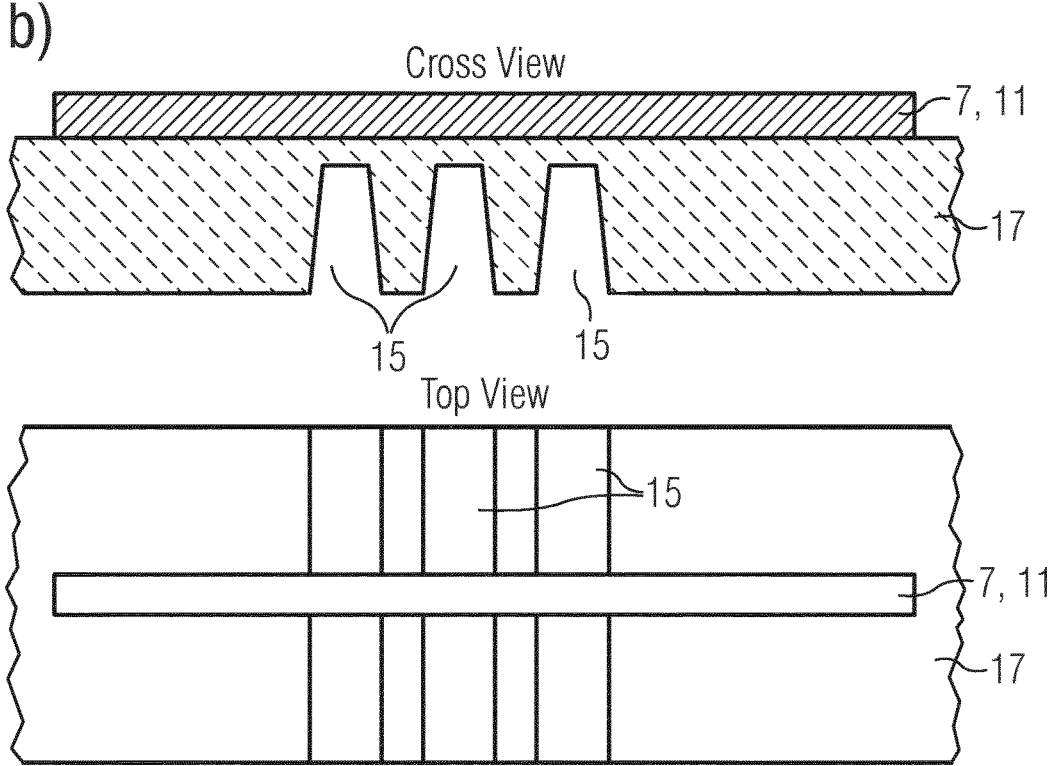
Figure 6:
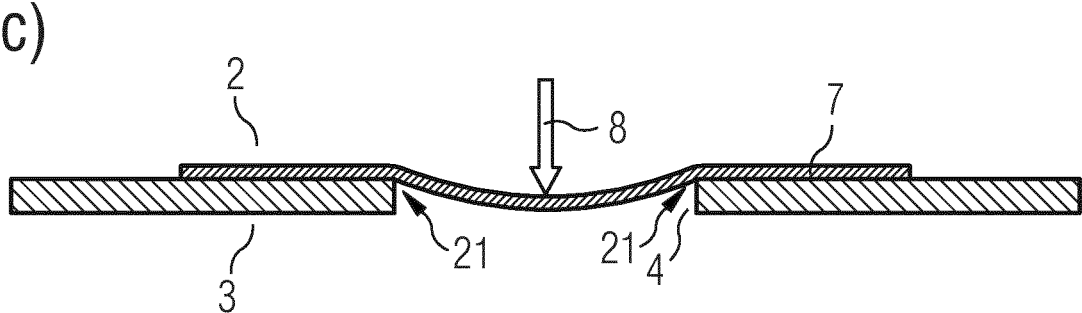
Figure 6:
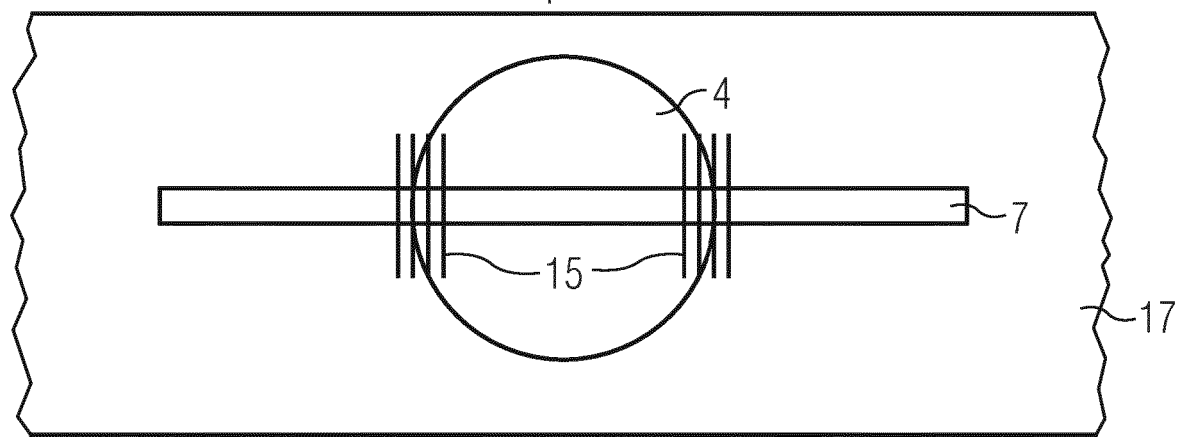
Figure 6:
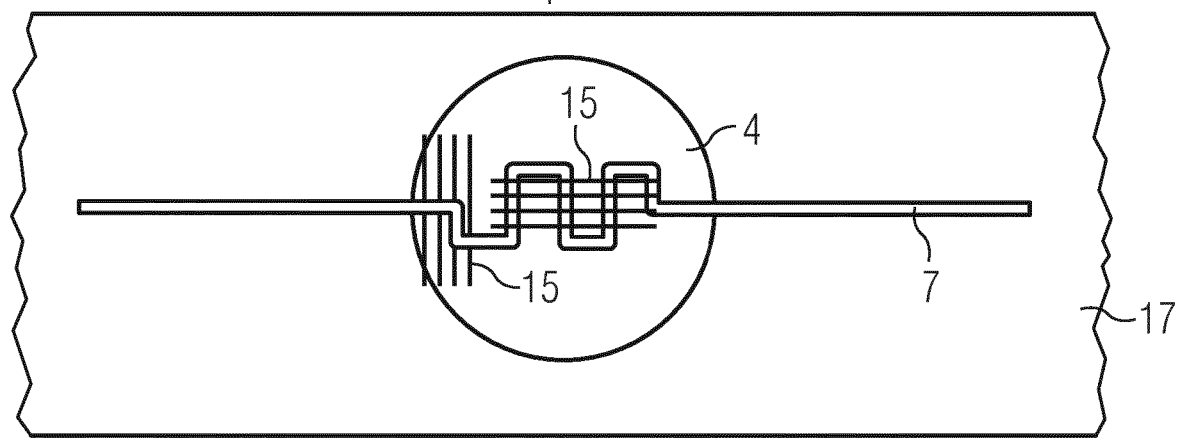

In order to influence the differential pressure threshold of the differential pressure sensor different mechanisms for selective weakening the sensing element 11 or tamper loop 7 can be employed. Because the breaking (resistance value going from low to very high) of the tamper loop track plays a crucial role as an indicator of reaching a certain differential pressure threshold. FIGS. 6 *a*) to *d*) describe different mechanisms to aid the breaking of the tamper loop 7, which is especially important in for example filter applications, where the differential pressure over the filter can be expected to be low. The same mechanisms can also be used to tune the breaking of the tamper loop track to specific differential pressures. The mechanisms that are described below can be used separately or in combination.

FIG. 6*a*) shows different tear line 15 depths; thereby a certain amount of material is removed along a line or curve 15, making it easier for the tamper loop track to break. In the common situation of a conducting tamper loop on a carrier material, some of the carrier material, the whole carrier material and even some of the track material can be removed to tune the breaking of the tamper loop to specific differential pressure thresholds.

FIG. 6*b*) shows different numbers and orientations of tear lines. One or more tear lines can be used and these lines can be orientated in any direction with respect to the track of the tamper loop 7. The use of multiple tear lines 15 and the orientation direction can both be used to aid the breaking of the tamper loop 7 and to tune for specific differential pressure thresholds.

FIG. 6*c*) shows another possibility to influence the breaking point of the tamper loop. The tear or cut lines 15 can be inserted in areas of greatest stress 21. By positioning the tear lines 15 in the area where the stress on the material due to the pressure difference is highest 21, the force on the tamper loop 7 and on the material to break will be optimized.

In another embodiment of the disclosure the specific differential pressure threshold is adjustable by a tracking design of the tamper loop 7 by passing the tear lines 15 in the surface area of the hole 4 in the sensing element several times (FIG. 6*d*). The track design of a tamper loop 7 can be a straight line in the simplest case, but the track of the tamper loop 7 can also take any other shape to optimize the breaking potential. E.g. the track of the tamper loop 7 can be shaped like a square wave in order to increase the total length of the tamper loop 7 and to expose the force caused by the differential pressure.

In another preferred embodiment the specific differential pressure threshold at which the material of the tamper loop tears can be modified by influencing material properties of the tamper loop. This can be done by the choice of a thickness and/or type of material of the RFID tag 17 or tamper loop 7 in a surface area of the hole 4 in the sensing element. Different types of materials can be used, e.g. silver ink screen printing can be used for very thin tamper loop tracks or epoxy with conductive properties can be used for very brittle tamper loop tracks that easily break when bent.

Also knife and/or needle like structures can be used to assist the tearing of the tamper loop.

Figure 7:
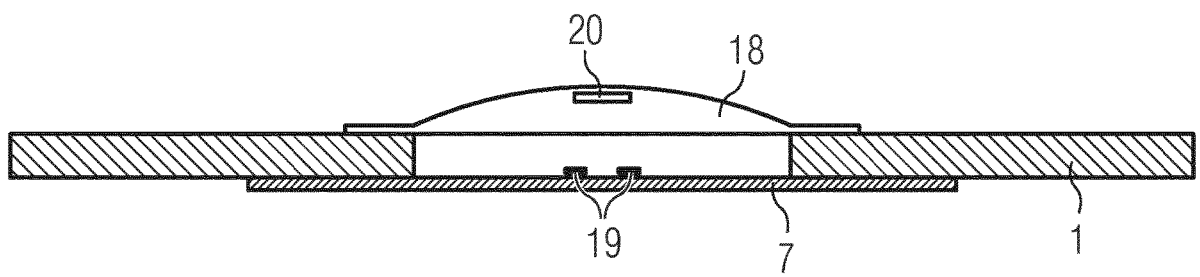
FIG. 7: Another embodiment for detecting a differential pressure threshold by using a bi-stable cup spring.
Figure 7:
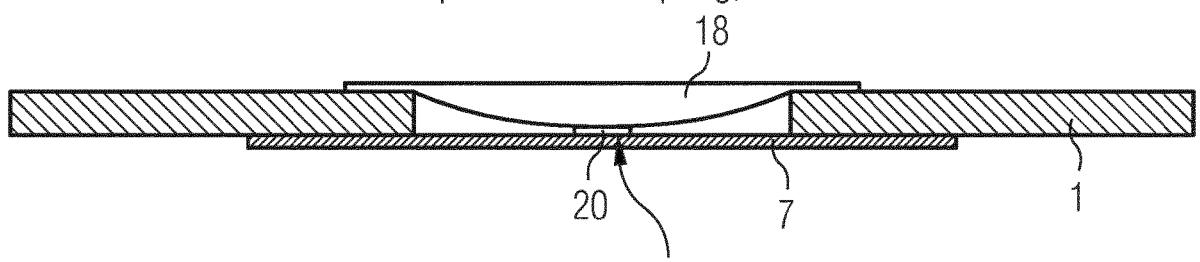

Another embodiment of the disclosure provides the RFID tag with a resettable pressure indicator such that the RFID tag can be reset and used many times (FIG. 7). Another advantage of this embodiment is that there is no gas flow requirement and the two gas volumes remain completely separated from each other. This embodiment uses a bi-stable cup spring 18 to trigger the tamper loop 7. The cup 18 is suspended over the hole like the tamper loop 7. The difference gas pressure between the two volumes of gas will depress the cup 18 and cause it to go from a stable convex to a stable concave state at a certain and well defined difference pressure threshold. The tamper loop 7 on the RFID tag in this case is interrupted by means of two pads 19 with a certain distance between them, so that the normal state of the loop is one of high or infinite resistance. When the cup 18 goes from convex to concave, a conductive element 20 on the bottom of the cup 18 will press against the two pads 19 causing the tamper loop 7 to close. As this is a stable state for the cup 18, it will remain in this position, and therefore indicate that a certain difference pressure threshold has been reached. As before, the switch in status of the tamper loop 7 is recognized by the IC 6 and can be read with a RFID reader. The resetting of the RFID tag 17 is done by bringing the cup 18 back in the convex state by e.g. mechanical means or applying a reverse differential pressure. Summarizing this preferred embodiment, the differential pressure pushes the membrane into the hole. The membrane deforms, resulting the conductive element of the bi-stable switching element touching an underlying metal line, meaning the tamper loop. In this case the resistance then jumps from high (no connection) to low (connected). This change is detected by the RFID IC and can be read by the RFID interrogation.

Differential pressure sensor with RFID tag

REFERENCE SIGNS

1: differential pressure sensor
2: high pressure side
3: low pressure side
4: hole
5: tag antenna
6: tag integrated circuit
7: tamper loop
8: force on tag
9: perforation in the sensing element or RFID tag
10: broken tamper loop
11: sensing element, e.g. a membrane or filter
12: outside pressure of the housing
13: inside pressure of the housing
14: housing; lid with small hole
15: tear line or cut line;
17: tear line or cut line
18: carrier of the tamper loop or RFID tag
19: bi-stable cup spring
20: conductive pads
21: conductive element
21: stress points

The invention claimed is:

1. Differential pressure sensor comprising a sensing element sensing a differential pressure between a low pressure side and a high pressure side and a RFID tag comprising a tag antenna, a tag integrated circuit (IC) and a tamper loop connected to the tag IC for tracking a specific differential pressure threshold of the differential pressure sensor by detecting if the tamper loop is closed/unbroken or opened/broken, whereas the RFID tag is connected to the sensing element in such a way that the tamper loop as part of the RFID tag is triggered if the specific differential pressure threshold has been reached by detecting a low resistance or a high resistance.

2. Differential pressure sensor according to claim 1, wherein the sensing element is a membrane.

3. Differential pressure sensor according to claim 1, wherein the sensing element is a filter element.

4. Differential pressure sensor according to claim 1, wherein the RFID tag covers airtight a hole in the sensing element in such a way that a part of the tamper loop suspends over the hole and the tamper loop tears if the specific differential pressure threshold has been reached.

5. Differential pressure sensor according to claim 1, wherein the RFID tag comprises a bi-stable cup spring mounted over the tamper loop, whereas the bi-stable cup spring closes a conductive contact at the tamper loop if the specific differential pressure threshold has been reached and the conductive contact is open in an initial state if the specific differential pressure threshold has not been reached.

6. Differential pressure sensor according to claim 5, wherein the bi-stable cup spring is usable several times by resetting the conductive contact in its initial state.

7. Differential pressure sensor according to claim 1, wherein the specific differential pressure threshold is adjustable by a size of the hole in the sensing element.

8. Differential pressure sensor according to claim 1, wherein the specific differential pressure threshold is adjustable by a thickness and/or type of material of the RFID tag or tamper loop in a surface area of the hole in the sensing element.

9. Differential pressure sensor according to claim 8, wherein the selective weakening is performable by mechanical or laser perforation and/or mechanical or laser kiss cutting.

10. Differential pressure sensor according to claim 1, wherein the specific differential pressure threshold is adjustable by a selective weakening of the material of the RFID tag or tamper loop by tear lines in the surface area of the hole in the sensing element or the tamper loop itself.

11. Differential pressure sensor according to claim 1, wherein the specific differential pressure threshold is adjustable by the number and/or orientation of the tear lines in the surface area of the hole in the sensing element.

12. Differential pressure sensor according to claim 1, wherein the specific differential pressure threshold is adjustable by a tracking design of the tamper loop by passing the tear lines in the surface area of the hole in the sensing element several times.

13. Differential pressure sensor according to claim 1, wherein the specific differential pressure threshold is adjustable by a positioning of the tear lines in the surface area of the hole in the sensing element of greatest stress.

14. Differential pressure sensor according to claim 1, wherein the RFID tag is placed in a protective housing.

15. Differential pressure measuring process using the differential pressure sensor according to claim 1, wherein the process comprising the following steps:
   monitoring a differential pressure by an activated tag IC of a RFID tag,
   detecting if a pre-defined differential pressure threshold has been reached by an infinite resistance of a tamper loop as part of the RFID tag or
   detecting if the pre-defined differential pressure threshold has not been reached by a zero resistance of a tamper loop as part of the RFID tag
   using a RFID transponder.

* * * * *